(12) United States Patent
Liu et al.

(10) Patent No.: US 10,911,287 B2
(45) Date of Patent: Feb. 2, 2021

(54) TRANSMITTER AND CORRESPONDING METHOD

(71) Applicant: Alcatel Lucent, Nozay (FR)

(72) Inventors: Haijing Liu, Shanghai (CN); He Wang, Shanghai (CN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/321,088

(22) PCT Filed: Jul. 27, 2017

(86) PCT No.: PCT/IB2017/001215
§ 371 (c)(1),
(2) Date: Jan. 28, 2019

(87) PCT Pub. No.: WO2018/025093
PCT Pub. Date: Feb. 8, 2018

(65) Prior Publication Data
US 2019/0173713 A1    Jun. 6, 2019

(30) Foreign Application Priority Data

Jul. 28, 2016    (CN) .......................... 2016 1 0608119

(51) Int. Cl.
*H04L 27/26*        (2006.01)
*H04L 25/03*        (2006.01)
*H04J 11/00*        (2006.01)

(52) U.S. Cl.
CPC .... *H04L 27/2646* (2013.01); *H04L 25/03343* (2013.01); *H04L 27/264* (2013.01); *H04L 27/2634* (2013.01); *H04J 2011/0009* (2013.01)

(58) Field of Classification Search
CPC .............. H04J 2011/0009; H04J 13/00; H04L 25/03343; H04L 27/2634; H04L 27/264;
(Continued)

(56) References Cited

U.S. PATENT DOCUMENTS 8,687,822 B1    4/2014  Meyer et al.
8,836,434 B2 *  9/2014  Bellaouar ............ H03C 3/0991
                                                    327/156
(Continued)

FOREIGN PATENT DOCUMENTS

CN        101272188 A      9/2008
CN        101420246 A      4/2009
(Continued)

OTHER PUBLICATIONS

Maximilian Matthé et al., "A Reduced Complexity Time-Domain Transmitter for UF-OFDM," IEEE 83rd Vehicular Technology Conference, pp. 1-5, XP032920020, 2016.
(Continued)

*Primary Examiner* — Phuc H Tran
(74) *Attorney, Agent, or Firm* — Fay Sharpe LLP

(57) ABSTRACT

The present disclosure provides a transmitter and a corresponding method. The method includes: pre-processing a signal to be transmitter, the signals being across a plurality of sub-bands; filtering the signal to generate a universal-filtered orthogonal frequency division multiplexing (UF-OFDM) signal, where two or more sub-bands of the plurality of sub-bands are filtered by a common filter; and transmitting the generated UF-OFDM signal.

11 Claims, 3 Drawing Sheets

(58) Field of Classification Search
CPC . H04L 27/2646; H04L 1/004; H04L 27/0008; H04L 27/2615; H04L 27/2627; H04L 27/2631; H04L 27/3411; H04L 27/3416; H04L 5/0016; H04L 5/0021; H04L 5/0066; H04L 27/2601; H04L 5/0048; H04L 1/04; H04L 27/2637; H04L 27/2614; H04L 27/2647; H04L 5/0023; H04L 5/0073; H04L 1/0056; H04L 25/0202; H04L 1/206; H04L 27/01; H04L 27/148; H04L 27/18; H04L 27/206; H04L 27/2602; H04L 27/2636; H04L 27/265; H04L 27/2697; H04L 27/362; H04W 72/04

See application file for complete search history.

(56) References Cited

U.S. PATENT DOCUMENTS

| | | | |
|---|---|---|---|
| 8,923,785 | B2 | 12/2014 | Howard et al. |
| 9,455,760 | B1* | 9/2016 | Dick ................. H03F 1/3247 |
| 10,038,585 | B2* | 7/2018 | Wild ................. H04L 25/03828 |
| 2002/0044014 | A1* | 4/2002 | Wright ................. H03F 1/3241 330/2 |
| 2011/0103457 | A1 | 5/2011 | Phan Huy et al. |
| 2011/0228828 | A1 | 9/2011 | Wang et al. |
| 2014/0147112 | A1* | 5/2014 | Abe ................. H04B 10/25137 398/25 |
| 2015/0304146 | A1 | 10/2015 | Yang et al. |
| 2016/0050039 | A1 | 2/2016 | Ma et al. |
| 2016/0211999 | A1* | 7/2016 | Wild ................. H04L 27/264 |

FOREIGN PATENT DOCUMENTS

| | | |
|---|---|---|
| CN | 102138309 A | 7/2011 |
| CN | 102790742 A | 11/2012 |
| CN | 105471567 A | 4/2016 |
| CN | 105610748 A | 5/2016 |
| JP | 2016-506125 A | 2/2016 |
| KR | 2015-0091370 A | 8/2015 |
| WO | WO 2015/018621 A1 | 2/2015 |
| WO | WO 2016/010684 A1 | 1/2016 |

OTHER PUBLICATIONS

Thorsten Wild et al., "5G Air Interface Design based on Universal Filtered (UF-) OFDM," 19$^{th}$ International Conference on Digital Signal Processing, IEEE, pp. 699-704,.

International Search Report for PCT/IB2017/001215 dated Dec. 13, 2017.

Maximilian Matthë, "A Reduced Complexity Time-Domain Transmitter for UF-OFDM,"2016 IEEE 83$^{rd}$ Vehicular Technology Conference (VTC Spring), 5 pages.

Nokia, Alcatel-Lucent Shanghai Bell, "Subband-wise filtered OFDM for New Radio below 6 GHz," 3GPP TSG-RAN WG1 #85, R1-165014, May 23-27, 2016, Nanjing, P.R. China, pp. 2-11.

* cited by examiner

TRANSMITTER AND CORRESPONDING METHOD

FIELD

Embodiments of the present disclosure generally relate to the field of communications, and more specifically, to a method and apparatus for processing a Universal-Filtered Orthogonal Frequency Division Multiplexing (UF-OFDM) signal.

BACKGROUND

Universal-Filtered Orthogonal Frequency Division Multiplexing (UF-OFDM), also known as universal filtered multi-carrier (UFMC), is a promising technology in OFDM-based 5G communication system. In the UF-OFDM transmitter, it usually demands filtering signals. Therefore, a sub-band finite impulse response (FIR) filter is employed to filter sub-carrier groups. Since the waveform of each sub-band is synthesized separately, the number of frequency-time transformations and filtering operations has to be equal to the number of sub-bands, which is a main factor that impacts UF-OFDM signal processing efficiency.

SUMMARY

According to a first aspect, a communication method is provided. The method includes: pre-processing a signal to be transmitted, the signals being across a plurality of sub-bands; filtering the signal to generate a Universal-Filtered Orthogonal Frequency Division Multiplexing (UF-OFDM) signal, where two or more sub-bands of the plurality of sub-bands are filtered by a common filter; and transmitting the generated UF-OFDM signal.

In some embodiments, the method further includes: determining a bandwidth of continuous sub-bands in the plurality of sub-bands; determining, based on the determined bandwidth, a filter coefficient for filtering the continuous sub-bands by referring to a predetermined look-up table, where the look-up table stores correlations between bandwidths of sub-bands and respective filter coefficients.

In some embodiments, each of the plurality of sub-bands has a same bandwidth, and determining the bandwidth of the continuous sub-bands includes determining the number of sub-bands in the continuous sub-bands.

In some embodiments, the pre-processing includes: pre-equalizing a frequency domain signal; and transforming the frequency domain signal to a time domain by a frequency-time transformation to obtain the signals to be transmitted.

In some embodiments, the pre-equalizing comprises: determining a filter coefficient for the filtering; and determining, based a bandwidth of the plurality of sub-bands and the filter coefficient, a parameter for the pre-equalizing.

In some embodiments, the filtering includes: filtering a first group of continuous sub-bands in the plurality of sub-bands using a first filter; and filtering a second group of continuous sub-bands in the plurality of sub-bands using a second filter, the first and second groups of continuous sub-bands being discontinuous from one another, and the first filter being different from the second filter.

In some embodiments, the filtering comprises: filtering the signal using a finite impulse response filter.

According to a second aspect of the present disclosure, there is provided a transmitter. The transmitter includes a controller; and a memory coupled to the controller, the controller configured, with the memory, to: pre-process a signal to be transmitted, the signal being across a plurality of sub-bands; and filter the signals to generate a Universal-Filtered Orthogonal Frequency Division Multiplexing (UF-OFDM) signal for transmission by the transmitter, two or more sub-bands of the plurality of sub-bands being filtered by a common filter.

According to a third aspect of the present disclosure, there is provided a transmitter. The transmitter comprises a computing module, including: a pre-processing module configured to pre-process a signal to be transmitted, the signal being across a plurality of sub-bands; and a filtering module configured to filter the signals to generate a Universal-Filtered Orthogonal Frequency Division Multiplexing (UF-OFDM) signal for transmission, two or more sub-bands of the plurality of sub-bands being filtered by a common filter.

The Summary is provided to introduce the selections of concepts in a simplified way, which will be further explained in the following detailed descriptions of embodiments. The Summary does not aim at identifying key or vital features of the present disclosure or limiting the scope of the present disclosure.

BRIEF DESCRIPTION OF THE DRAWINGS

Through the more detailed description of example embodiments of the present disclosure with reference to the accompanying drawings, the above and other objectives, features, and advantages of the present disclosure will become more apparent, where same reference signs in the example embodiments of the present disclosure usually represent the same components.

DETAILED DESCRIPTION OF EMBODIMENTS

The example embodiments of the present disclosure will be described in more details with reference to the drawings. Although the drawings demonstrate the example embodiments of the present disclosure, it should be appreciated that the present disclosure may be implemented in various manners and should not be limited to embodiments explained herein. On the contrary, embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and the like can refer to same or different objects. The following text can comprise other explicit and implicit definitions.

Figure 1:
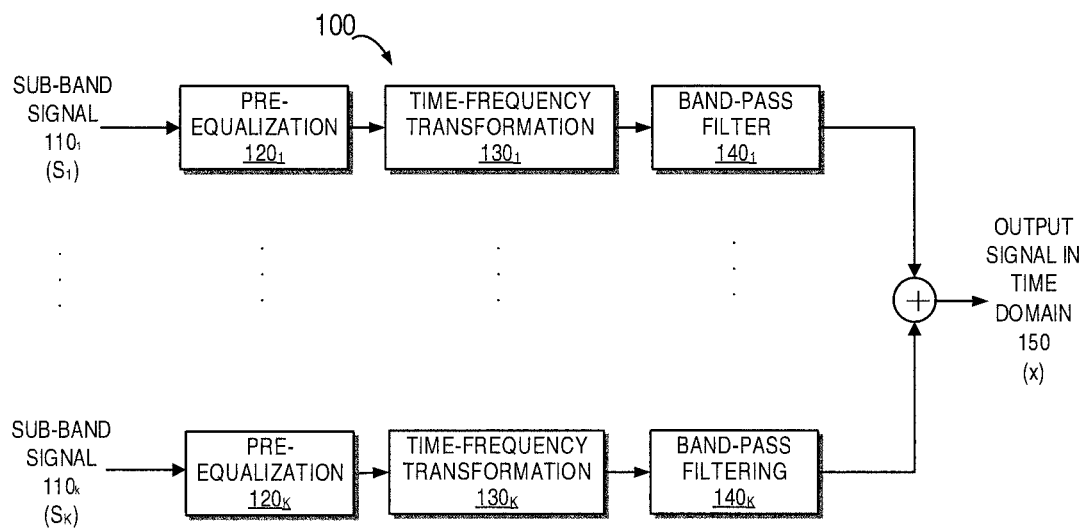
FIG. 1 shows an example block diagram of UF-OFDM transmitter in conventional solutions.

As described above, it requires the same number of time-frequency transformations and filter operations as the number of sub-bands when a UF-OFDM signal is transmitted. Traditionally, the same number of filters as the number of sub-bands is employed for implementing filtering as shown in FIG. 1. Specifically, UF-OFDM system 100 illustrated in FIG. 1 includes K sub-bands, from $110_1$ to $110_k$, where k is a natural number which is greater than 1, and each sub-band may include, for example, Q sub-carriers.

The processing on each sub-band signal $110_1$ to $110_k$ may be divided into a plurality of stages, Signals are pre-equalized at pre-equalization stages $120_1$ to $120_k$. Subsequently, the pre-equalized signals are transformed from frequency domain to time domain at frequency-time transformation stages $130_1$ to $130_k$. In the traditional solution, each sub-band signal which has been time-frequency transformed, is filtered by its respective sub-band filter $140_1$ ... $140_k$, where the respective sub-band filter is a prototype filter of which a length of shifted frequency is L. An output signal 150 (denoted as x) in time domain can be expressed as:

$$x = \sum_{k=1}^{K} F_k V_k P_k s_k$$

where $s_k \in C^{Q \times 1}$ denotes an Q*1 matrix representing the bearing information signal transmitted on the k-th sub-band; $P_k \in C^{Q \times Q}$ denotes a Q*Q pre-equalization diagonal matrix; $V_k \in C^{N \times Q}$ denotes a sub-matrix of N-point Inverse Discrete Fourier Transform matrix which is an N*Q matrix, which contains only the columns that correspond to the subcarrier frequencies of the k-th sub-band; and $F_k \in C^{(N+L-1) \times N}$ denotes an (N+L−1)*N matrix which represents a Toeplitz matrix composed of the FIR filter coefficient response.

However, according to the above solution, when data is transmitted across a plurality of sub-bands, the above implementation becomes complicated due to each sub-band having a separate sub-band filter. To at least partially solve the above and other potential problems and drawbacks, the present disclosure provides a method for reducing complexity of transmitter and being available for the UF-OFDM system.

Figure 2:
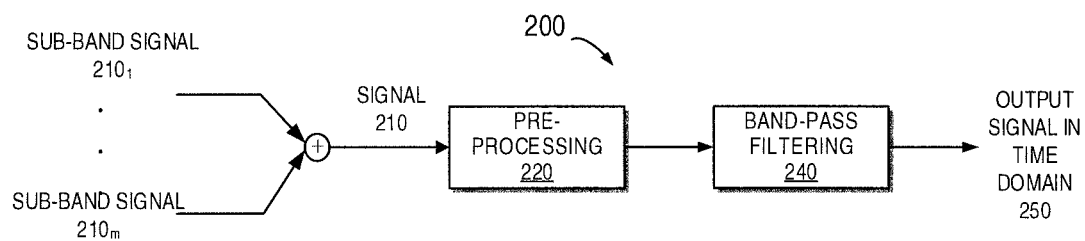
FIG. 2 shows a schematic diagram of an example procedure 200 of processing UF-OFDM signals according to embodiments of the present disclosure.

FIG. 2 illustrates a schematic diagram of an example procedure 200 of processing UF-OFDM signals according to embodiments of the present disclosure. Each block in FIG. 2 may be regarded as each stage or step in the processing, or may be implemented as modules or components in the transmitter for instance.

According to an embodiment of the present disclosure, for a signal to be transmitted which is across a plurality of sub-bands, two or more sub-bands of the signal are filtered with the same filter, which significantly improves performance and efficiency of processing UF-OFDM signals and reduce the processing costs. For instance, in the example shown in FIG. 2, signal 210 is a signal across continuous sub-bands $210_1$ ... $210_n$. It is to be understood that technical terms "sub-band" and "sub-band signal" may be interchanged in the context of the present disclosure.

If these sub-bands satisfy pre-determined conditions (which will be discussed later), they can be filtered as a whole to output a time domain signal 250, which is in contrast to FIG. 1. Optionally, the above procedure of pre-processing 220 (e.g., pre-equalization and frequency-time transformation) may be overall completed. That is to say, the procedure is different from the traditional solution that pre-equalizes, frequency-time transforms and band-pass filters 240 each of the sub-bands $210_1$ ... $210_n$ occupied by signal 210.

It is to be understood from the following description that embodiments of the present disclosure do not require using only one filter on all bands. For example, sub-bands $210_1$ ... $210_n$ in to-be-transmitted signal 210 may include a plurality of groups and the sub-bands in each group are continuous whereas discontinuity exists among groups. At this time, a particular filter is employed for each group. Compared with the traditional solution, the performance of the transmitter may be significantly improved in this way. Example implementations in this aspect may also be described later.

Figure 3:
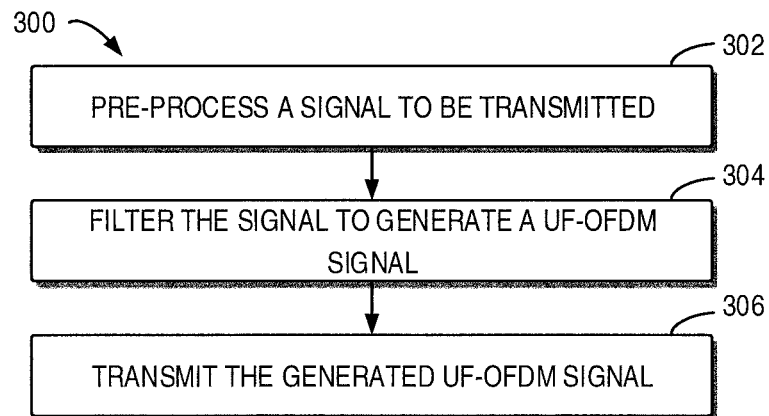
FIG. 3 shows an example flowchart of a method or procedure 300 of processing UF-OFDM signals according to embodiments of the present disclosure.

FIG. 3 is an example flowchart of a method or procedure 300 of processing UF-OFDM signals according to embodiments of the present disclosure. The method 300 may be implemented by the transmitter and examples of the transmitter may be depicted in the following with reference to FIGS. 5 and 6.

At block 302, signals to be transmitted may be pre-processed and the signals may be across a plurality of sub-bands. In some embodiments, the pre-processing at block 302 may include, but not be limited to, pre-equalizing frequency domain signals to be transmitted and transforming frequency domain signals to time domain signals by frequency-time transformation. It is to be understood that the processing at block 302 in FIG. 3 is the processing in the pre-processing stage 220 in FIG. 2. In some embodiments, pre-processing may include pre-equalizing process and parameters of pre-equalization are determined based on the determined bandwidth and the determined filter for filtering. This will be further described in the following text with reference to FIG. 4.

At block 304, UF-OFDM signals are generated by filtering the signals and two or more sub-bands of the plurality of sub-bands are filtered by a common filter. The operation here may be implemented at filtering stage 240 in FIG. 2. In some embodiments, filtering may include but not be limited to: determining bandwidth of continuous sub-bands in the plurality of sub-bands; determining filter coefficients for filtering continuous sub-bands by referring to a predetermined look-up table based on the determined bandwidth, where the look-up table stores correlations between bandwidths of a plurality of sub-bands and respective filter coefficients.

At block 306, the generated UF-OFDM signals may be transmitted. In some embodiments, the generated UF-OFDM signals are transmitted to an RF circuit/module in the transmitter.

According to the procedure 300 illustrated in FIG. 3, complexity is irrelevant to the number of sub-bands occupied by signals to be transmitted. In this way, compared with the traditional UF-OFDM, a large amount of computing resources may be saved.

Figure 4:
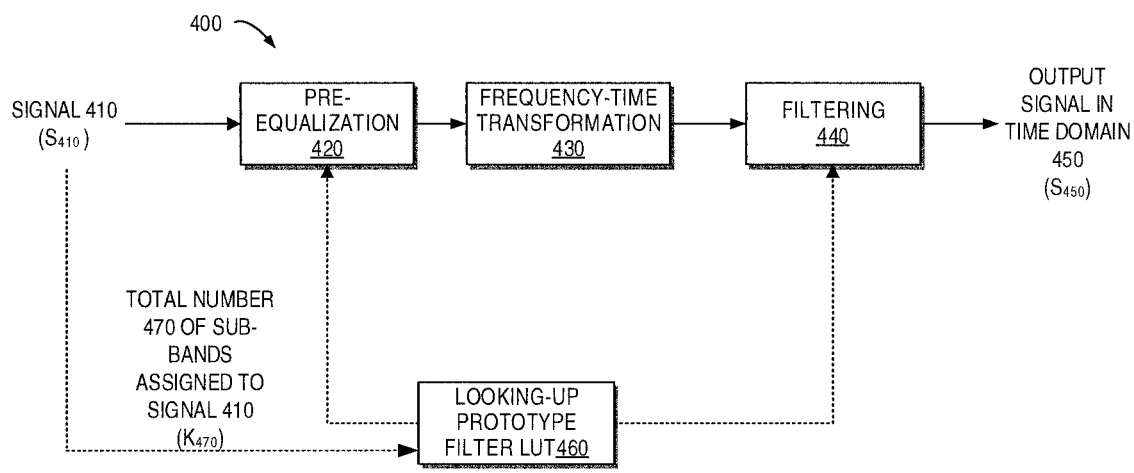
FIG. 4 shows a schematic diagram of an example procedure 400 of processing UF-OFDM signals according to one embodiment of the present disclosure.

FIG. 4 illustrates a schematic diagram of an example procedure 400 for processing UF-OFDM signals according to embodiments of the present disclosure. Each block in FIG. 4 may be regarded as each stage or step in the processing, or may be implemented as modules or components in the transmitter for instance. Explanation is made with reference to the flowchart in FIG. 3 and in combination with the example implementation indicated in FIG. 4. It is to be understood that the procedure 400 in FIG. 4 only illustrates a procedure of an example implementation of the present invention. Pre-equalization 420 and frequency-time transformation 430 in FIG. 4 may only be possible implementations of pre-processing 220 in FIG. 2. Similarly, looking up a prototype filter LUT 460 may also be a procedure of an example implementation of the present disclosure. Hence, those skilled in the art can understand that there are some possible implementations not indicated in FIG. 4.

As stated above, signal 410, which is a signal across a plurality of continuous sub-bands, may be pre-processed (block 302 in FIG. 3). In some embodiments, pre-processing may at least include two stages, i.e., pre-equalization 420 and frequency-time transformation 430. To be specific, any currently existing or to be developed means may be employed at 420 to pre-equalize the signal. Afterwards, the pre-equalized signal may be transformed from a frequency-domain signal to a time-domain signal at 430. In some embodiments, the applied method of time-frequency transformation may be Inverse Fast Fourier Transformation (IFFT) or other time-frequency transformation methods.

Particularly, in some embodiments, a filter for filtering 440 the signal 410 may be determined, more specifically, filter coefficient. Then, parameters of pre-equalization 420 may be determined based on the number of continuous sub-bands and the determined filter coefficients. In such way, a "feedback loop" may be formed between pre-equalization and filtering, in order to make them cooperate and coordinate more satisfactorily.

Next, the pre-processed signal 410 may be filtered 440 (block 304 in FIG. 3) to generate a UF-OFDM signal. In some embodiments, bandwidth of continuous sub-bands in the signal 410 may be determined at 440. After that, the filter coefficients for filtering continuous sub-bands in the signal 410 may be determined by referring to a predetermined look-up table 460 based on the determined bandwidth of the signal 410, where the look-up table 460 stores correlations between bandwidths of a plurality of sub-bands and respective filter coefficients. In some embodiments, determining bandwidth of the continuous sub-bands in signal 410 may include determining the number 470 ($K_{470}$) of continuous sub-bands. In some embodiments, the prototype sub-band filter stored in the look-up table 460 is a finite impulse response filter (FIR). It should be appreciated that other suitable types of filters may also be utilized. An example of the look-up table 460 is illustrated below:

| Number of sub-bands | L-tap FIR coefficient |
|---|---|
| 1~$K_1$ | $f_1$ |
| $K_1$ + 1~$K_2$ | $f_2$ |
| ... | ... |
| $K_{M-1}$ + 1~$K_M$ | $f_M$ |

Based on the determined bandwidth of signal 410 and the number 470 ($K_{470}$) of continuous sub-bands in signal 410, a prototype sub-band filter having the same bandwidth as signal 401 may be looked-up in the look-up table 460 and filter coefficients for the prototype sub-band filter having the same bandwidth as signal 401 may be determined. The utilized filter coefficients are identical to the filter coefficients for the prototype sub-band filter having the same bandwidth as signal 401. The output signal 450 in time domain (represented as $S_{450}$) may be represented as $$S_{450} = FVP\ S_{410}$$

where $S_{410}$ denotes KQ*1 matrix representing the bearing information signal transmitted on all the K sub-bands, where Q indicates the number of sub-carriers for each sub-band; P denotes an KQ*KQ pre-equalization diagonal matrix; V denotes a sub-matrix of the N-point Inverse Discrete Fourier Transform matrix which is a N*KQ matrix, where the sub-matrix V may contain the columns that correspond to the subcarrier frequencies of all the K sub-bands.

In this example, the number of continuous sub-bands is 470 ($K_{470}$) and signals to be transmitted of the number Q of sub-carriers for each sub-band may be taken as the number of sub-bands $K_{470_1}$ that equals to 1 and the number of sub-carriers of the sub-band signal may be $Q_1$ that equals to $K_{470}$*Q, because the number of frequency-time transformations in UF-OFDM system and the times of filtering are equal to the number of sub-bands Because the number of sub-band of signals to be transmitted may be viewed as 1, both the number of frequency-time transformations and the time of filtering may be 1. Furthermore, as described above, embodiments of the present disclosure may utilize the finite impulse response filter, of which examples include but not be limited to Chebyshev filter. Certainly, any other suitable types of filters can also be used here.

In some embodiments, a plurality of sub-bands occupied by signals to be transmitted may not entirely continuous. At this time, a dedicated filter may be adopted for continuous sub-bands of each group at 304. Assuming that the plurality of sub-bands $210_1$, . . . $210_m$ of the signal includes a first group of sub-bands and a second group of sub-bands, and the first group of sub-bands and the second group of sub-bands are respectively continuous, but the first group of sub-bands and the second group of sub-bands are not continuous with each other. At this point, the first group of sub-bands is filtered by the first filter and the second group of sub-bands is filtered by the second filter at 304, where the first filter is different from the second filter.

Figure 5:
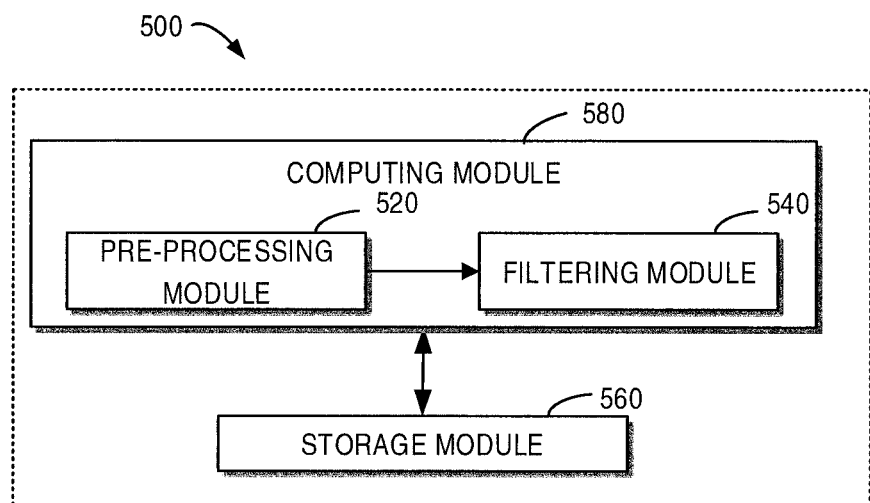
FIG. 5 shows a simplified block diagram of apparatus 500 for implementing embodiments of the present disclosure.

FIG. 5 illustrates a simplified block diagram of an apparatus 500 suitable for implementing embodiments of the present disclosure. It should be appreciated that the apparatus 500 can be implemented at base station (BS) and also the user equipment (UE). As shown, the apparatus module 500 may include a computing module 580. In some embodiments, the computing module 580 may also be connected to constellation mapping module (not shown), sub-band signal generating part (not shown) and RF module (not shown).

The computing module 580 may include a pre-processing module 520 and a filtering module 540. The pre-processing module 520 may be configured to pre-process signals to be transmitted, where the signals cross a plurality of sub-bands. The filtering module 540 may be configured to filter the signals to generate UF-OFDM signals for transmission, where two or more sub-bands of the plurality of sub-bands are filtered by a common filter.

In some embodiments, the filtering module 540 may also be configured to: determine bandwidth of continuous sub-bands in the plurality of sub-bands; determine filter coefficients for filtering the continuous sub-bands by referring to a predetermined look-up table based on the determined bandwidth, where the look-up table stores correlations between bandwidths of the plurality of sub-bands and respective filter coefficients. In some embodiments, the look-up table can be stored in a storage module 560 communicatively connected to the computing module 580. The look-up table may also be stored at other appropriate positions.

Figure 6:
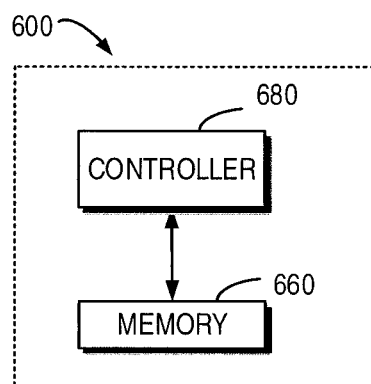
FIG. 6 shows an example diagram of transmitter 600 for implementing embodiments of the present disclosure.

FIG. 6 is a simplified block diagram of a transmitter 600 suitable for implementing embodiments of the present invention. It is to be understood that the transmitter 600 can be included in a network device, such as base station (BS), and/or in a terminal device, e.g., user equipment (UE).

According to FIG. 6, the transmitter 600 may include a controller 680 and a memory 660 connected to the controller 680. It should be appreciated that the transmitter 600 may also include other elements, such as an RF circuit (not shown). The controller 680 may execute the above procedure and method described with reference to FIGS. 2 to 4 under configuration of memory 660. In some embodiments, the controller 680 may also execute operations, such as generating sub-band signals and on the like. The controller 680 may be field programmable gate array (FPGA), digital signal processor (DSP) and other one or more combinations of the elements capable of implementing embodiments of the present disclosure.

In the embodiments that employ the look-up table, the look-up table may be stored in the memory 660. In some embodiments, the memory 660 may be a storage element externally connected to the controller 680. In some embodiments, the memory 660 can be storage elements inside the controller 680. The memory 660 can be a random-access memory (RAM), read-only memory (ROM) or one or more combinations of other appropriate types of memory.

The flowchart and block diagram in the drawings illustrate possible system architecture, functions and operations implemented by system and method according to embodiments of the present disclosure. At this point, each block in the flowchart or block diagram may represent one module, program segment or a part of the instruction, the module, program segment or the part of the instruction including one or more executable instructions for implementing stipulated logic functions. In the alternative implementations, functions indicated in the blocks may also occur in an order different from the one denoted in the drawings. For example, two consecutive blocks in fact can be executed basically in parallel or may in a reverse order sometimes dependent on the involved functions. It is to be understood that each block in the block diagram and/or flowchart and combinations of blocks in the block diagram and/or flowchart may be implemented by a hardware-based system dedicated for executing stipulated functions or actions, or combinations of dedicated hardware and computer instructions.

Various embodiments of the present disclosure have been described above and the explanations are exemplary and non-exhaustive, and should not be limited to the disclosed embodiments. Without deviating from the scope and spirits of the explained embodiments, many alterations and modifications become apparent for those ordinary skilled in the art. The selection of technical terms in the text aim to best explain principles, practical applications of each embodiment and their technical contributions to the technology in the market, or enable other ordinary skilled in the art to understand various embodiments disclosed in the text.

We claim:

1. A communication method, comprising:
 pre-processing a signal to be transmitted, the signal being across a plurality of sub-bands;
 filtering the signal to generate a Universal-Filtered Orthogonal Frequency Division multiplexing (UF-OFDM) signal, two or more of the plurality of sub-bands being filtered by a common filter; and
 transmitting the generated UF-OFDM signal,
 wherein the pre-processing comprises:
 pre-equalizing a frequency domain signal; and
 transforming the frequency domain signal into a time domain by a frequency-time transformation to obtain the signal to be transmitted, and
 wherein the pre-equalizing comprises:
 determining a filter coefficient for the filtering; and
 determining, based on a bandwidth of the plurality of sub-bands and the filter coefficient, a parameter for the pre-equalizing.

2. The method of claim 1, wherein the filtering comprises:
 determining a bandwidth of continuous sub-bands in the plurality of sub-bands;
 determining, based on the determined bandwidth, a filter coefficient for filtering the continuous sub-bands by referring to a predetermined look-up table, the look-up table storing correlations between bandwidths of sub-bands and respective filter coefficients.

3. The method of claim 2, wherein the plurality of sub-bands has a same bandwidth, and
 wherein determining the bandwidth of the continuous sub-bands comprises determining the number of the continuous sub-bands.

4. The method of claim 1, wherein the filtering comprises:
 filtering a first group of continuous sub-bands in the plurality of sub-bands using a first filter; and
 filtering a second group of continuous sub-bands in the plurality of sub-bands using a second filter, the first and second groups of continuous sub-bands being discontinuous from one another, and the first filter being different from the second filter.

5. The method of claim 1, wherein the filtering comprises:
 filtering the signal using a finite impulse response filter.

6. A transmitter, comprising:
 a controller; and
 a memory coupled to the controller, the controller configured, with the memory, to:
 pre-process a signal to be transmitted, the signal being across a plurality of sub-bands; and
 filter the signal to generate a Universal-Filtered Orthogonal Frequency Division Multiplexing (UF-OFDM) signal for transmission by the transmitter, two or more of the plurality of sub-bands being filtered by a common filter,
 wherein the controller is further configured to:
 pre-equalize a frequency domain signal; and
 transform the frequency domain signal into a time domain by a frequency-time transformation to obtain the signal to be transmitted, and
 wherein the controller is further configured to:
 determine a filter coefficient for the filtering; and
 determine, based on a bandwidth of the plurality of sub-bands and the filter coefficient, a parameter for the pre-equalizing.

7. The transmitter of claim 6, wherein the controller is further configured to:
 determine a bandwidth of continuous sub-bands in the plurality of sub-bands; and
 determine, based on the determined bandwidth, a filter coefficient for filtering the continuous sub-bands by referring to a predetermined look-up table, the look-up table storing correlations between bandwidths of sub-bands and respective filter coefficients.

8. The transmitter of claim 7, wherein the plurality of sub-bands has a same bandwidth, and the controller is further configured to:
 determine the bandwidth of the continuous sub-bands by determining the number of the continuous sub-bands.

9. The transmitter of claim 6, wherein the controller is configured to:
 filter a first group of continuous sub-bands in the plurality of sub-bands using a first filter; and filter a second group of continuous sub-bands in the plurality of sub-bands using a second filter, the first and second groups of continuous sub-bands being discontinuous from one another, and the first filter being different from the second filter.

10. The transmitter of claim 6, wherein the controller is configured to:

filter the signal using a finite impulse response filter.

11. A transmitter, comprising:

a computing module including:
- a pre-processing module configured to pre-process a signal to be transmitted, the signal being across a plurality of sub-bands; and
- a filtering module configured to filter the signal to generate a Universal-Filtered Orthogonal Frequency Division Multiplexing (UF-OFDM) signal for transmission, two or more of the plurality of sub-bands being filtered by a common filter,
    - wherein the pre-processing module is further configured to:
    - pre-equalize a frequency domain signal; and
    - transform the frequency domain signal into a time domain by a frequency-time transformation to obtain the signal to be transmitted, and
    - wherein the filtering module is further configured to:
    - determine a filter coefficient for the filtering; and
    - determine, based on a bandwidth of the plurality of sub-bands and the filter coefficient, a parameter for the pre-equalizing.

\* \* \* \* \*